April 26, 1966 M. K. HAYNES 3,248,708

MEMORY ORGANIZATION FOR FAST READ STORAGE

Filed Jan. 22, 1962

8 Sheets-Sheet 1

INVENTOR
MUNRO K. HAYNES
BY Elmer W. Galbi[illegible]
ATTORNEY

April 26, 1966 M. K. HAYNES 3,248,708

MEMORY ORGANIZATION FOR FAST READ STORAGE

Filed Jan. 22, 1962 8 Sheets-Sheet 2

April 26, 1966 M. K. HAYNES 3,248,708

MEMORY ORGANIZATION FOR FAST READ STORAGE

Filed Jan. 22, 1962 8 Sheets-Sheet 3

April 26, 1966 M. K. HAYNES 3,248,708

MEMORY ORGANIZATION FOR FAST READ STORAGE

Filed Jan. 22, 1962 8 Sheets-Sheet 4

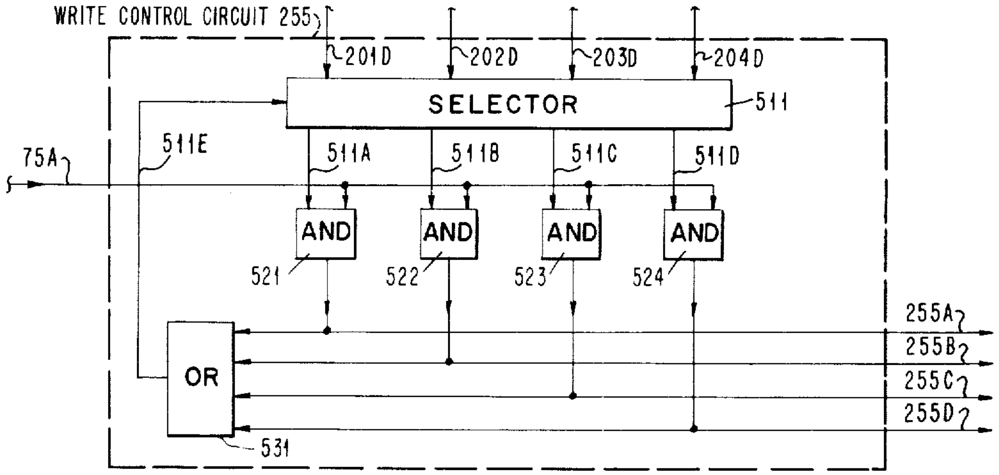
FIG. 5
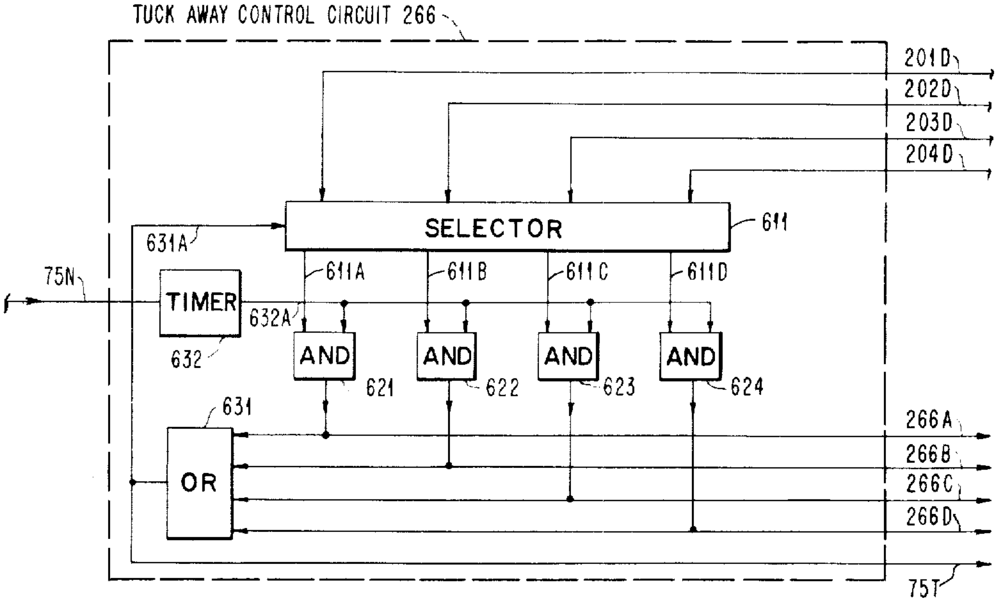
FIG. 6
FIG. 7
| MEMORY | MEMORY TYPE | ADDRESS SYMBOL X | Y | Z |
|---|---|---|---|---|
| 21 | NONDESTRUCTIVE READ | 1 | 0 | 1 |
| 22 | NONDESTRUCTIVE READ | 1 | 0 | 0 |
| 23 | READ ONLY | 0 | 1 | 0 |
| 24 | HIGH SPEED | 0 | 1 | 1 |

April 26, 1966 M. K. HAYNES 3,248,708

MEMORY ORGANIZATION FOR FAST READ STORAGE

Filed Jan. 22, 1962 8 Sheets-Sheet 8

3,248,708
Patented Apr. 26, 1966

3,248,708

MEMORY ORGANIZATION FOR FAST READ STORAGE

Munro K. Haynes, Chappaqua, N.Y., assignor to International Business Machines Corporation, New York, N.Y., a corporation of New York Filed Jan. 22, 1962, Ser. No. 167,505
10 Claims. (Cl. 340—172.5)

This invention relates to digital computers and more particularly to a memory system for digital computers.

One of the severe limitations in the computing systems of the prior art is that their memories are much slower than their arithmetic and logical processing elements. Hence, either the speed of the entire system must be slowed down to the speed of the memory or such techniques as "memory look ahead" must be employed. An example of a machine in which memory look ahead is employed is the IBM Stretch machine which is described in a paper "The Virtual Memory in the Stretch Computer," Proceedings of the Eastern Joint Computer Conference, December 1959.

Memory look ahead does allow a relatively slow memory system to be operated in conjunction with a high speed logical system; however, memory look ahead involves the use of large amounts of additional hardware. Furthermore, full advantages cannot be taken of the memory look ahead hardware unless special care is taken when programs are written for the system. The programs must be specially written so that the memory look ahead hardware can be utilized to its full potential. Such programming is very difficult and it lacks flexibility. Furthermore, memory look ahead techniques cannnot efficiently handle branch or conditional transfer instructions.

High speed memories which operate in the same speed range as high speed circuitry can be built; however, such memories cannot be built in large sizes and they are extremely expensive. For example, a relatively high speed memory can be built using thin magnetic films if the size of the memory is not too large, also a small high speed memory could be built using high speed transistor flip-flop or tunnel diodes; however, such memories are prohibitively expensive, The magnetic core memories which are generally used in computer systems have a destructive read, that is, they destroy the information stored therein when the information is read from the memory. Hence, a memory cycle generally involves two phases. During the first phase, information is read from a particular location and during the second phase this same information or different information is stored in the particular memory location. Magnetic core memories which have a nondestructive read, that is, memories which do not destroy the information stored in a location when the information is read from the location are known in the prior art. An example of such a memory may be found in copending application Serial No. 76,807, now Patent No. 3,196,413 issued July 20, 1965, entitled "Non-Destructive Memory Element" filed December 19, 1961, by M. Teig and assigned to the assignee of the present invention.

Information can be read from nondestrcutive read magnetic core memories much faster than it can be read from destructive read magnetic core memories; however, the time required to write information into a nondestructive read memory is about equivalent to the time required to store information in a destructive read magnetic core memory. The present invention is directed at providing a computing system which takes advantage of the fast read time of a nondestructive read memory and which is not limited by the write time of a nondestructive read memory (n.b., the write time of a nondestructive read memory is longer than the read time).

The present invention combines a central processing unit, a nondestructive read memory, and a small high speed memory. Data words generated by the processing unit are first placed in the small high speed memory (allowing them to be stored quickly). Later, while the processing unit is not accessing memory, the information is transferred from the small high speed memory to the nondestructive read memory automatically without further control by either the program or by the central processing unit. A "look behind" control is provided whereby the system can determine whether a certain desired information word which was previously sent to the small high speed memory for eventual storage in the nondestructive read memory has as yet been stored in the nondestructive read memory or whether it is still stored in the high speed memory. If the information is still in the high speed memory, it is read from the high speed memory instead of from the addressed location in the nondestructive read memory.

In order to keep the look behind control to a reasonable size, a second small high speed memory (or a section of the first high speed memory) is used to store data words which are generated by the central processing unit and which will only be stored in memory for a short period of time. Since the second high speed memory is only used to store words which remain in storage for short periods of time, it can be quite small, and hence it does not add an unreasonable amount to the cost of the overall system. This second small high speed memory is hereafter called a "scratch pad memory."

The system can also include a "read-only" memory. A large storage capacity can be obtained at a relatively small cost with a read-only memory and furthermore information can be read from read-only memory quickly. However, in order to change the information stored in a read-only memory, certain of the physical components must be changed or moved. Such memories are known in the prior art. For example, see copending application Serial No. 823,997 and now abandoned by W. L. McDermid, entitled "Memory Device and Element." A read-only memory is useful for storing such information as systems and diagnostic programs, subroutines which need not be changed frequently, and other data such as conversion or other tables to which the system periodically needs access.

The present invention, therefore, combines in a memory complex one or more relatively large nondestructive read memories which have a fast read time and a slower write time and which have a relatively low cost per storage location with one or more small high speed memories which have a fast read time and a fast write time and which have a relatively high cost per storage location. The resulting system has a fast write time, a fast read time and a relatively low cost per storage location.

The system can also include a read-only memory which has a fast read time and into which information cannot be written (except by mechanical motion of components). The read-only memory has an even lower cost per storage location than the nondestructive read memories and it can be built in large sizes. By using the read-only memory for storing information and sub-routines which need not be changed frequently, the cost per storage location of the resulting system can be further reduced with no sacrifice in speed of reading or writing.

An object of the present invention is to provide an improved computer system.

A further object of the present invention is to provide a computer system which has a memory complex wherein information can be quickly stored and from which information can be quickly read.

Still another object of the present invention is to combine a plurality of different types of memories in a system which takes advantage of the advantages of each type of memory system and which is not limited by the disadvantages of any type of memory system.

Yet another object of the present invention is to provide a computer memory system wherein information can be read in the access time of a nondestructive read memory and which has a write time which is shorter than that of a nondestructive read memory.

Still another object of the present invention is to provide a computer memory system consistent with the above objects which is relatively inexpensive.

A still further object of the present invention is to provide a computer memory system which has both a short read time and a short write time.

A still further object of the present invention is to provide a computer memory system which includes a nondestructive read memory and a small high speed memory wherein the read time is only limited by the read time of the nondestructive read memory and the write time is only limited by the write time of the small high speed memory.

The foregoing and other objects, features and advantages of the invention will be apparent from the following more particular description of preferred embodiments of the invention, as illustrated in the accompanying drawings.

In the drawings:

FIGURE 1 is an overall flow diagram of the preferred embodiment described herein.

FIGURES 1*a* and 1*b* (which fit together as shown in FIGURE 1*c*) are an overall circuit diagram of the preferred embodiment described herein.

FIGURE 5 is a detailed circuit diagram of the write control circuit shown in block form in FIGURE 2*a*.

FIGURE 6 is a detailed circuit diagram of the tuck-away control circuit shown in block form in FIGURE 2*a*.

FIGURE 7 is a table showing the meaning of the first three binary bits of any address.

Figure 1:
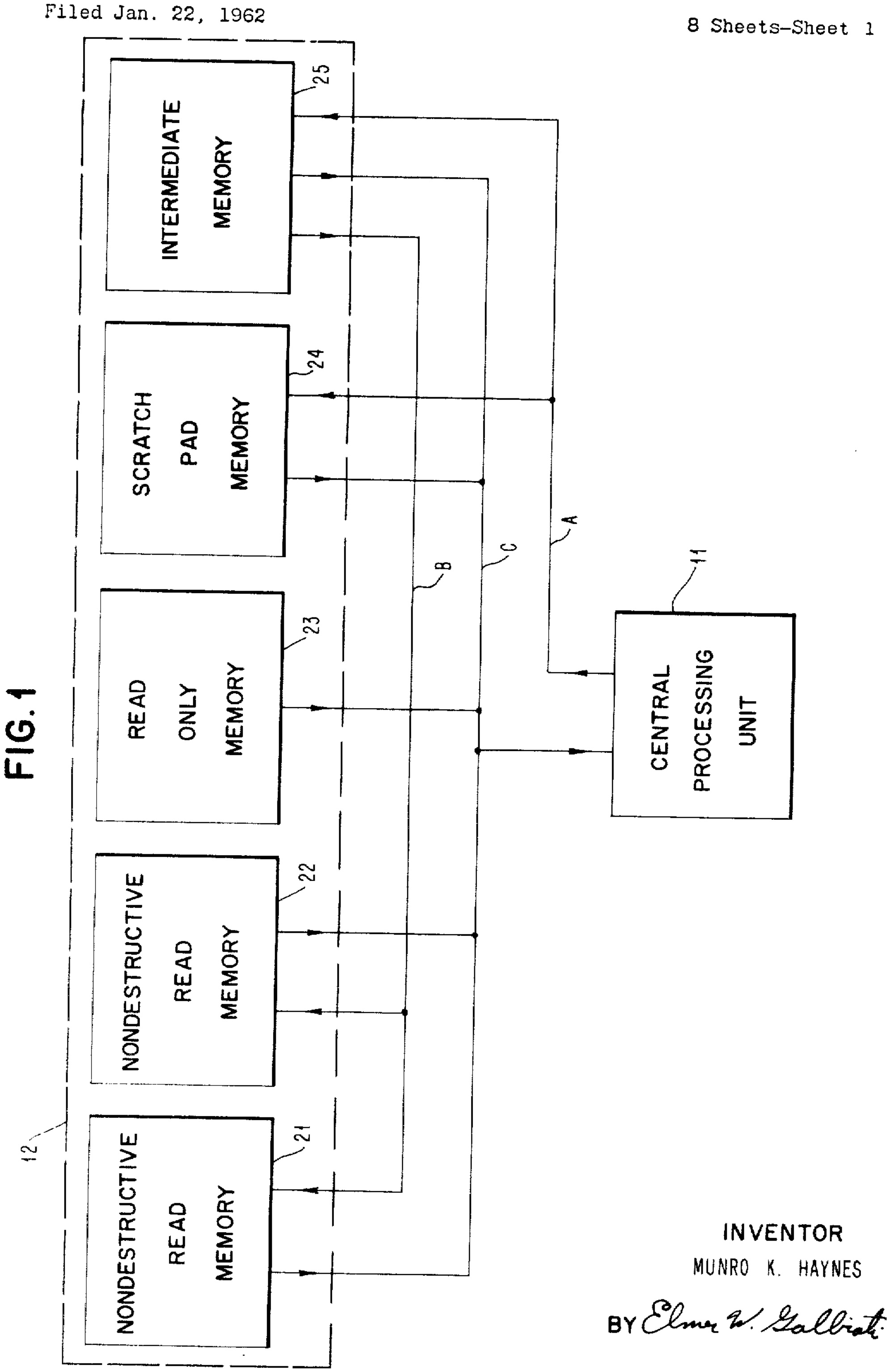

The embodiment of the invention shown herein includes a central processing unit 11 and a memory complex 12. Memory complex 12 includes two nondestructive read memories 21 and 22, a read only memory 23, a high speed scratch pad memory 24, and a high speed intermediate memory 25. FIGURE 1 is a flow diagram showing in diagrammatic form the various possible operations which the system may perform. First, as indicated by the arrows designated by the letter A, information may be transferred from central processing unit 11 to memories 24 and 25. Second, as indicated by the arrows designated by the letter B, information can be transferred from intermediate memory 25 to nondestructive read memories 22 and 23, and third, as indicated by the arrows designated by the letter C, information can be transferred from any one of the memories 21 to 25 to the central processing unit 11. The paths designated A, B and C in FIGURE 1 do not necessarily represent circuitry. Instead, they merely indicate the various operations that can occur.

Central processing unit 11 is a conventional arithmetic and logical unit similar to the arithmetic and logical units included in computing systems known in the prior art. Central processing unit 11 is capable of generating requests to read the information word stored in a specified location in memory complex 12 and requests to write a particular data word in a specified location in memory complex 12.

Memories 21 and 22 are nondestructive read memories such as those described in the previously referenced patent application entitled "Non-Destructive Memory Element." Information can be read from these memories very quickly. However, it takes a relatively longer period of time to write information into them. It takes between five and ten times longer to write a word into such memories than it takes to read a word from them. Memory 23 is a read only memory which can be of the type described in the fore-referenced patent application entitled "Memory Device and Element." Information can be read from read only memory 23 in a relatively short period of time; however, in order to change the information which is stored in read only memory 23 some mechanical steps such as changing punched hole cards or plates must be used.

Memories 24 and 25 are small high speed memories. Each of the memories 24 and 25 can only store a small number of words and hence even though the cost of the memories 24 and 25 per storage location is relatively high the overall cost added to the system by memories 24 and 25 is not prohibitive.

The cost of nondestructive read memories 21 and 22 per storage location is appreciably less than the cost per storage location of high speed memories 24 and 25 and the cost per storage location of read only memory 23 is even less than the cost per storage location of memories 21 and 22. Read only memory 23 is larger than nondestructive read memories 21 and 22 and nondestructive read memories 21 and 22 are much larger than high speed memories 24 and 25. Hence, the overall cost per storage location of memory complex 12 is in the vicinity of the cost per storage location of nondestructive read memories 21 and 22.

It is important to note that memories 21 to 25 have different capabilities. Information can be read from memories 21 and 22 quickly; however, it requires a relatively long period of time to write information into memories 21 and 22. In contrast to memories 21 and 22, information can be quickly written into or read from memories 24 and 25 and information can be read from read only memory 23 quickly; however, the information stored therein can only be changed by a manual operation.

Information is not transferred directly from the central processing unit 11 to nondestructive read memories 21 and 22. Instead when central processing unit 11 attempts to store a data word in a particular location in either nondestructive read memory 21 or 22 both the address of the particular register and the data word are transferred to one of the storage locations in intermediate memory 25. Thereafter when the central processing unit 11 is not accessing the memory complex 12, a control circuit (which will be explained later) reads the data word and the address from the storage location in intermediate memory 25 and transfers the data word to the specified location in memory 21 or 22.

When the central processing unit 11 wishes to store a data word in scratch pad memory 24, the data word is transferred directly to scratch pad memory 24. However, since scratch pad memory 24 has a fast write time, no time is lost in storing information therein. Naturally, the person who writes the program for the system (or the compiler program which produces the object program) must determine if a result will be used by central processing unit 11 within a short time after it is stored in memory complex 12, and if a result is to be used by the central processing unit 11 a short time after it is stored in memory complex 12, the result will be assigned an address in scratch pad memory 24. If however, a result will be stored in memory complex 12 for a relatively long time before it is used, it must be stored in one of the nondestructive read memories 21 or 22 since scratch pad memory 24 has a limited size and only a small number of data words can be stored therein at any one particular time.

When central processing unit 11 desires to read information from a storage location in either scratch pad memory 24 or read only memory 25, the system merely reads the specified location in either scratch pad memory 24 or read only memory 23 and transfers the information directly to the central processing unit 11 in a conventional manner. However, when the central processing unit 11 desires to read a word from a particular location in nondestructive read memory 21 or 22, the system does not positively know whether the information has as yet been stored in the specified location in nondestructive read memory 21 or 22, since there is a small but finite probability that the information may still be in intermediate memory 25. That is, the desired data word may not as yet have been transferred to nondestructive read memory 21 or 22. Hence, when central processing unit 11 desires to read a data word from nondestructive read memory 21 or 22, a look behind control (which will be explained later) simultaneously interrogates each of the memory locations in intermediate memory 25 to determine whether any of the locations therein contain the specified address, and, if so, the data word stored in the same storage location is read therefrom and transferred to central processing unit 11.

During the time that the system is simultaneously interrogating all of the registers in memory 25 to determine if they contain the specified address, the system also attempts to read out the specified memory location in nondestructive read memory 21 or in memory 22. If the desired information is not in intermediate memory 25, it must be in the specified location in nondestructive read memory 21 or 22, and hence the information is gated therefrom to central processing unit 11. If the desired information is found in intermediate memory 25 any information which is stored in the specified location in nondestructive read memory 21 or 22 is incorrect information and hence this information is not transferred from the nondestructive read memory 21 or 22 to the central processing unit 11.

Since the interrogation of all of the registers in memory 25 takes less time than it takes to access the appropriate location in nondestructive read memory 21 or 22, and since the interrogation of the memory locations in memory 25 can proceed simultaneously with the interrogation of the appropriate location in nondestructive read memory 21 or 22, no time is lost due to the fact that memory 25 is being interrogated.

The present invention thus combines different types of memories each of which have different capabilities and different limitations, the resulting system has the advantages of each of the different types of memories used and it does not have the disadvantages of each of the different types of memories. The nondestructive read memories have a fast read time and a slow write time and they are relatively inexpensive per storage location. The intermediate memory 25 has a fast read time and a fast write time; however, it is relatively expensive per storage location. The combination of the different types of memories in the present system results in a memory complex where information can be stored in the write time of the high speed memory 25 and from which information can be read in the fast read time of the nondestructive read memories 21 or 22. Yet, the memory complex is not unreasonably expensive since most of the storage space is obtained with the relatively low cost nondestructive read memories 21 and 22 and only a relatively small portion of the memory complex is implemented with the high cost components in intermediate memory 25.

The size of intermediate memory 25 and the size of the control circuitry associated therewith is reduced by including in the system for the storage of data which only remains in memory for a short period of time, the relatively small scratch pad memory 24 which has a fast read time and a fast write time. The cost of the system per storage location is further reduced by a read only memory 23, the information in which can only be changed by manual manipulations, but which has a relatively fast read time and a lower order cost per storage location than the nondestructive read memories 21 and 22. For information which does not need to be changed, the inexpensive memory locations in read only memory 23 operate as satisfactorily as would the more expensive memory locations in nondestructive read memories 21 and 22.

*Detailed description*

Figures 1A, 1C:
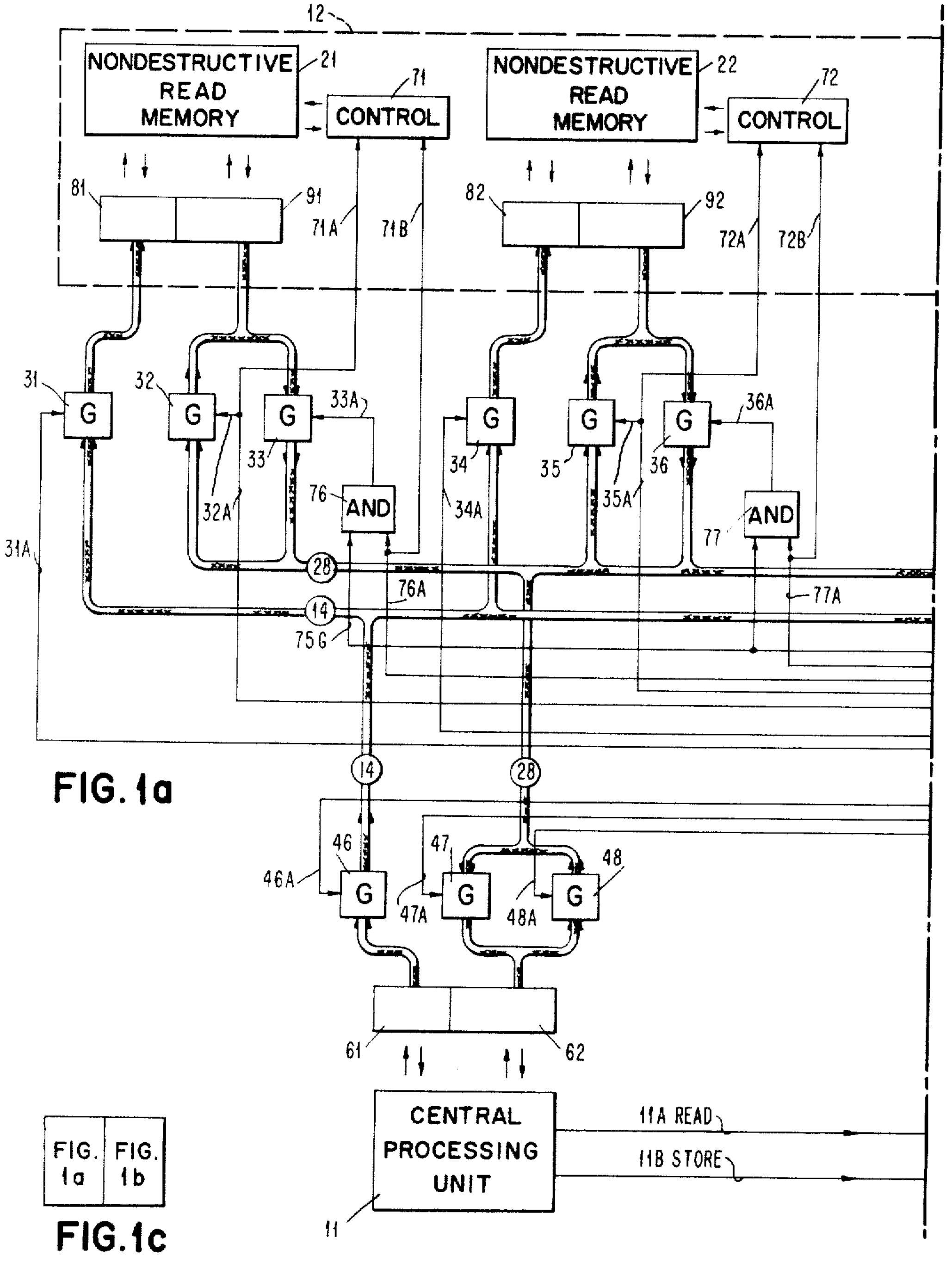
Figure 1B:
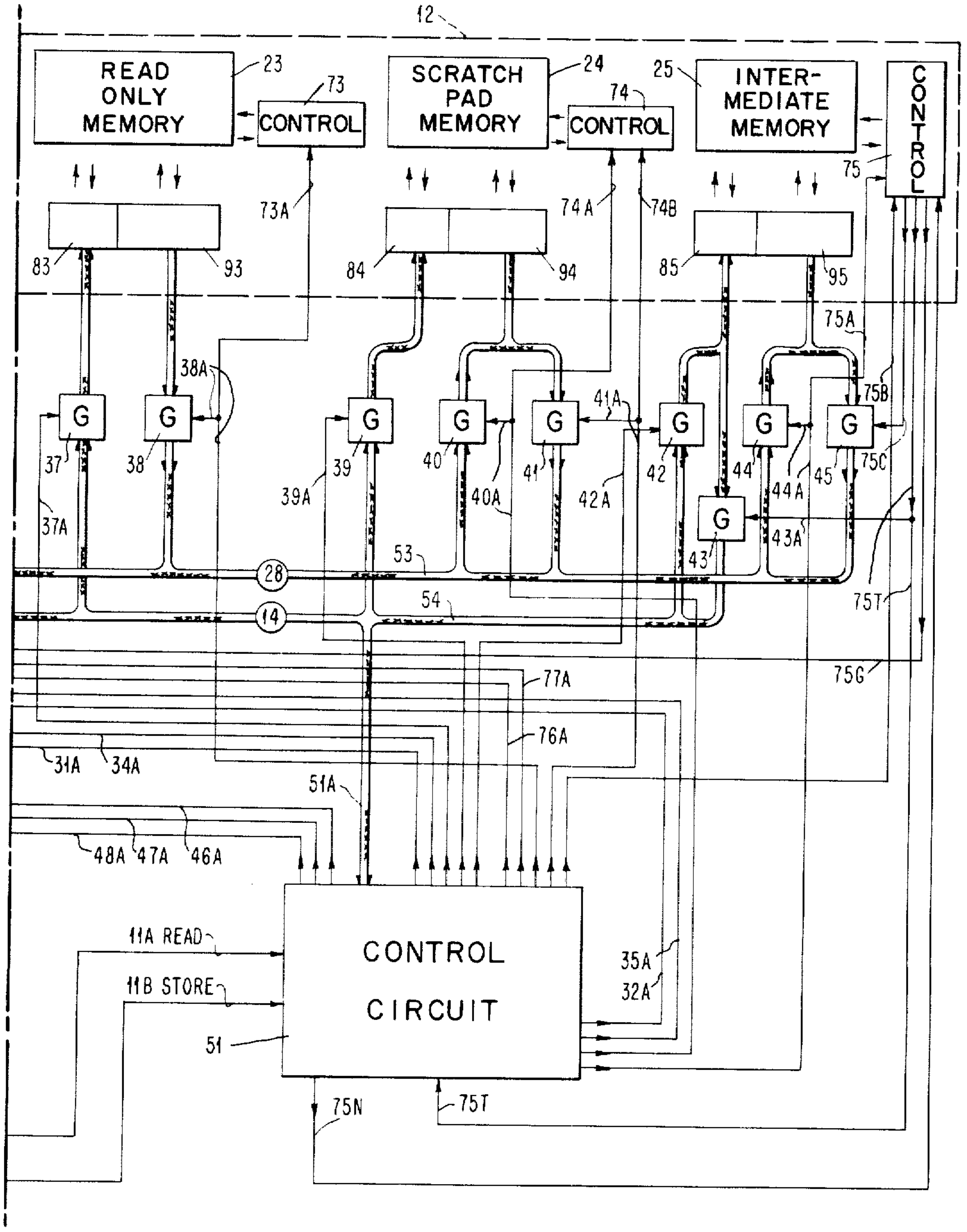

An overall circuit diagram of the first embodiment of the invention is shown in FIGURES 1*a* and 1*b* (which fit together as shown in FIGURE 1*c*). FIGURES 1*a* and 1*b* show the gating and control circuitry for transferring information from the central processing unit 11 to the memory complex 12 and from the memory complex 12 to the central processing unit 11. The gating and control circuitry which interconnects the central processing unit 11 with the memory complex 12 includes gates 31 to 48, AND circuit 76 and 77, control crcuit 51 and interconnections between the various units. Two types of interconnections, lines and cables, are shown. Lines which transmit a single control signal are indicated by single lines such as line 40A (FIGURE 1*b*) and cables or buses which transmit a plurality of binary bits which either form a data word or an address are represented by double lines such as cable 53 (FIGURE 1*b*). The number of lines in each cable (or bus) is shown in an expanded portion of each cable. For example, as shown in FIGURE 1*b*, cable 53 has twenty-eight lines therein for transmitting a twenty-eight bit data word.

Central processing unit 11 has associated therewith in a conventional manner a fourteen bit address register 61, a twenty-eight bit data register 62 and two output lines 11A and 11B. When the central processing unit 11 needs an information word which is stored in the memory complex 12, it places the address of the desired information word in register 61 and it activates line 11A. The system of the present invention then obtains the desired information word from memory complex 12 and gates this information word to register 62. The central processing unit 11 proceeds to utilize the data which it received in the conventional manner. If central processing unit 11 desires to store an information word in memory complex 12 it places the word in register 62 and the address at which it desires to store this information word in register 61 and then it activates line 11B. The system of the present invention then takes the information in register 62 and stores this information at the memory location specified by the address in register 61.

The word which central processing unit 11 places in register 62 before it activates line 11B to initiate a write operation is herein termed the object of the write request and the word which is read from one of the memories and transferred to central processing unit 11 in response to a read request is herein termed the object of the read request.

Each of the memories 21 to 24 has an associated control circuit, respectively, 71 to 74, an associated fourteen bit address register 81 to 84 and an associated twenty-eight bit data register 91 to 94. Each of the control circuits 71 to 74 has a control line respectively 71A to 74A and each of the control circuits 71, 72 and 74 has a second control line respectively 71B, 72B and 74B.

The manner in which information is written into and the manner in which information is read from memories 21 to 24 with respect to the operation of control circuits 71 to 74 and registers 81 to 84 and 91 to 94 will be explained by explaining the manner in which memory 21 operates. The other memories 22, 23 and 24 operate similarly. A data word is stored in memory 21 by first placing the data word in register 91, placing the address where the data word is to be stored in register 81, and then activating line 71A. When line 71A is activated, the control circuit 71 is effective to store the data word which is in register 91 at the address specified in register 81. In order to read a data word from memory 21 the address of the desired data word is placed in register 81 and then line 71B is activated. Control circuit 71 is then effective to read from memory 21 the data word stored in the address which is in register 81. The specific design of control circuit 71 and the manner in which memory 21 is connected to control circuit 71 and registers 81 and 91 is known in the art and no further description thereof will be given herein. Memories 22, 23 and 24 operate similarly to the manner described for the operation of memory 21. Naturally, since information cannot be stored in read only memory 23, control circuit 73 does not have an input 73B.

Intermediate memory 25 also has a control circuit 75, an address register 85 and a data register 95. Intermediate memory 25 in conjunction with control circuit 75 has the following capabilities: First, if an address is placed in register 85 and a data word is placed in register 95 and line 75A is activated, the control circuit 75 selects an empty location in memory 25 and stores therein both the data which is in register 85 and the data word which is in register 95. Second, if an address is placed in register 85 and line 75B is activated, control circuit 75 has the ability to simultaneously interrogate each location in intermediate memory 25 to determine if the address in register 85 is stored therein. If control 75 determines that there is a memory location in memory 25 which has stored therein the address specified in register 85, it reads the data word which is also stored in the same memory location into register 95 and it activates line 75C. Third, when line 75N is activated, control circuit 75 reads the information stored in the various locations in memory 25 into registers 85 and 95 and transfers each data word from register 95 to the address in memory 21 or 22 specified by the address in register 85.

Figure 2:
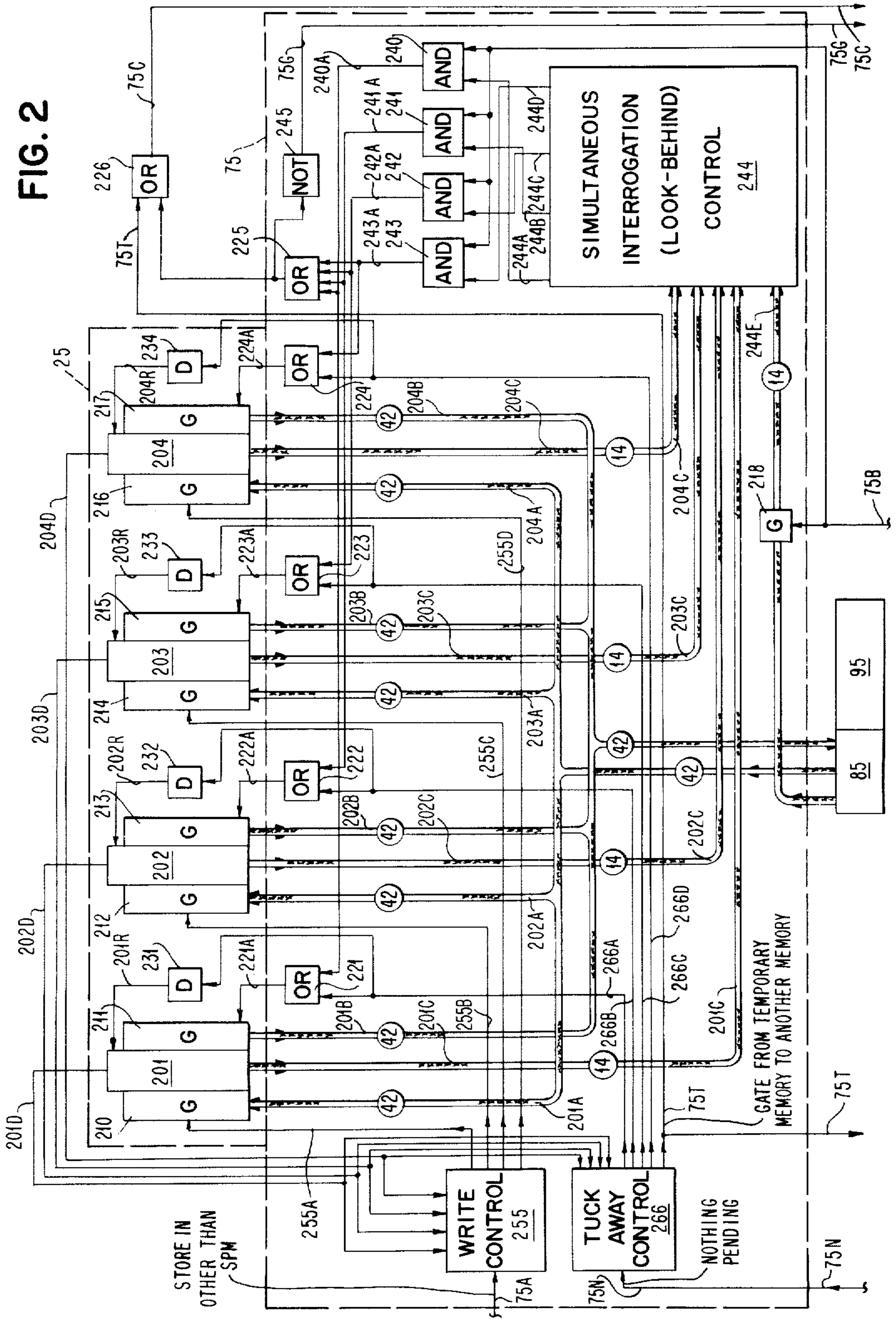
FIGURE 2 is an overall circuit diagram of the intermediate memory and the controls which are associated therewith and which are shown in block form in FIGURE 1*b*.
Figure 3:
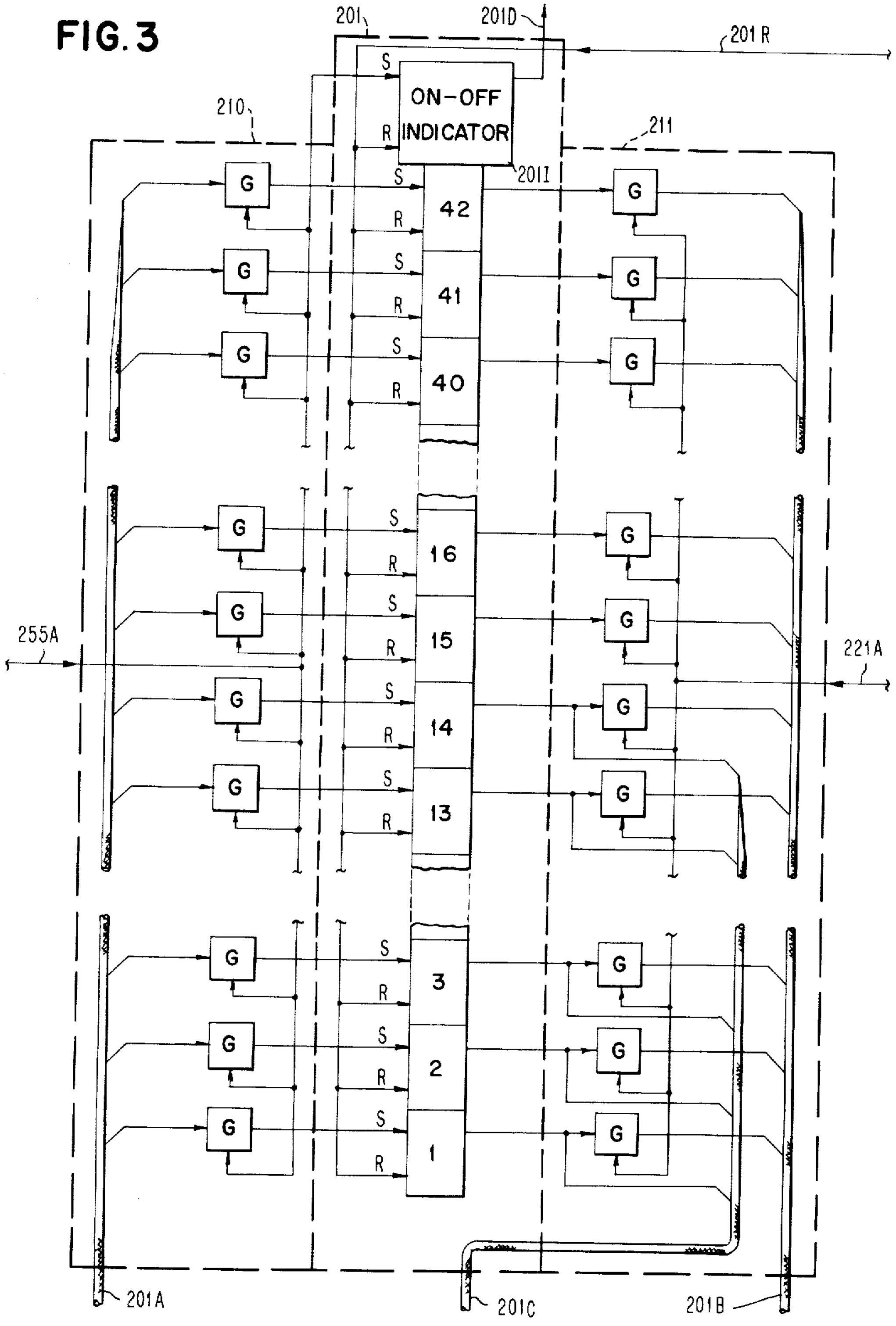
FIGURE 3 is a detailed circuit diagram of a representative one of the registers and associated gates which are shown in block form in FIGURE 2.

The details of the interconnections between intermediate memory 25, control circuit 75, register 85 and register 95 are shown in FIGURE 2. Memory 25 has four registers 201 to 204. Each of these registers has forty-two bit positions which is sufficient to store one twenty-eight bit data word plus one fourteen bit address. Registers 201 to 204 each have a reset line respectively 201R to 204R which resets all of the bit positions in the associated registers to the ZERO condition. Each of the registers 201 to 204 also has (1) an input cable respectively 201A to 204A through which information can be stored in each of the bit positions of the registers, (2) an output cable 201B to 204B through which each of the bit positions in the associated register can be read out and (3) an output cable 201C to 203C which is activated by the first fourteen bits in the registers (the fourteen bits which store an address). Each register 201 to 204 also has an output line respectively 201D to 204D which is active when information is stored in the associated register. The details of register 201 which is typical of registers 201 to 204 is shown in FIGURE 3 and will be explained in detail later.

Naturally, it should be understood that the intermediate memory 25 though herein shown as only having four registers 201 to 204 might contain more registers possibly up to fifteen or twenty registers. The number of registers in intermediate memory 25 will depend upon the size of the particular system in which the invention is being used. Four registers have been shown herein merely to indicate that memory 25 would have a much smaller number of registers than the number of storage locations in memories 21 and 22. Likewise, though no specific size is given for scratch pad memory 24 it should be understood that the size of scratch pad memory 24 is small relative to the size of memories 21 and 22. For example, if memories 21 and 22 each have several thousand locations scratch pad memory 24 would have in the order of magnitude of a few hundred or less storage locations.

Control circuit 75 includes write control circuit 255, simultaneous interrogation circuit 244 (alternately referred to as look behind control circuit 244), tuck-away control circuit 266, gating circuits 210 to 217, OR circuits 221 to 226, delay circuits 231 to 234, AND circuits 241 to 244, NOT circuit 245, and lines and cables interconnecting the various circuits.

Control circuit 75 performs three different types of control operations. First, when an address is placed in register 85 and line 75B is activated, control circuit 75 interrogates each of the registers 201 to 204 to determine if they have stored in their first fourteen bit positions the address contained in register 85. This is done by simultaneous interrogation circuit 244. Second, when an address is placed in register 85 and a data word is placed in register 95 and line 75A is activated, control circuit 75 selects one of the registers 201 to 204 which is empty and it stores the information which is in registers 85 and 95 in the selected register. This is done by write control circuit 255. Third, when line 75N is activated control circuit 75 reads out the information which is stored in one of the registers 201 to 204 (a data word plus an address) and it places the address and data words respectively in registers 85 and 95 and it then activates line 75T. This is performed by tuck-away control circuit 266. The manner in which each of the above operations is performed will now be explained in detail.

First, when an address is placed in register 85 and line 75B is activated, simultaneous interrogation circuit 244 (alternately termed look behind control circuit 244) simultaneously interrogates the first fourteen bit positions in each of the registers 201 to 204 to determine if any one of the registers contains the address which is in register 85. The first fourteen bits in registers 201 to 204 respectively activate the fourteen lines in cables 201C to 204C (the details of the circuitry in registers 201 to 204 will be explained later with reference to FIGURE 3). Activation of line 75B conditions gate 218 so that the fourteen bits stored in register 85 are transferred to simultaneous interrogation circuit 244 via cable 244E. Simultaneous interrogation circuit 244 compares the address received on cable 244E with the addresses received on each of the cables 201C to 204C. The details of the circuitry in simultaneous interrogation circuit 244 will be explained later with reference to FIGURE 4. If the address received from register 85 via cable 244E is the same as the address received on one of the lines 201C to 204C one of the outputs 244A to 244D is activated.

The activation of one of the lines 244A to 244D in conjunction with the activation of line 75B conditions one of the AND circuits 240 to 243 so that one of the lines 240A to 243A is activated. Lines 240A to 243A through OR circuits 221 to 224 control gates 211, 213, 215 and 217. Hence, when one of the lines 240A to 243A is activated, information is gated from one of the registers 201 to 204 to registers 85 and 95. Hence, when line 75B is activated and simultaneous interrogation circuit 244 determines that the address received on one of the cables 201C to 204C is the same as the address received on cable 244E, simultaneous interrogation circuit 244 activates one of the lines 244A to 244D which through AND circuits 240 to 243, OR circuits 221 to 224 and gates 211, 213, 215 and 217 transfers to register 95 the data word which is stored in the register 201 to 204 which contains the same address as is stored in register 85. Lines 240A to 243A are also connected to the input of OR circuit 225 and the output of OR circuit 225 through OR circuit 226 activates line 75C. Hence, line 75C is activated when the address received on cable 244E is the same as the address received on one of the cables 201C to 204C.

If simultaneous interrogation circuit 244 finds that the address received on cable 244E is not the same as the address received on any one of the cables 201C to 204C, none of the lines 244A to 244D is activated, and hence, none of the lines 240A to 243A is activated. The output of OR circuits 225 is activated whenever any one of the lines 240A to 243A is activated and the output of OR circuit 225 activates the input of NOT circuit 245. Hence, when none of the lines 240A to 243A is activated the output of OR circuit 225 is not activated and the output of NOT circuit 245 is activated. Hence, the output of NOT circuit 245 and output line 75G is activated whenever simultaneous interrogation circuit 244 finds that the address received on cable 244E does not compare to the address received on any one of the cables 201C to 204C.

When an address is placed in register 85 and a data word is placed in register 95 and line 75A is activated, write control circuit 255 selects one of the registers 201 to 204 which is empty and stores the information which is in registers 85 and 95 in the selected register. Write control circuit 255 has five input lines and four output lines. Input line 75A indicates when the information in register 85 and 95 is to be transferred to one of the registers 201 to 204 and lines 201D to 204D indicate which of the registers 201 to 204 are empty. Output lines 255A to 255D, respectively, control gate circuits 210, 212, 214 and 216.

Gates 210, 212, 214 and 216 control the transfer of information from registers 85 and 95 to registers 201 to 204. When line 75A is activated write control circuit 255 selects, by interrogating lines 201D to 204D, one of the registers 201 to 204 which is empty and it then activates one of the lines 255A to 255D in order to condition the appropriate gate 210, 212, 214 or 216 so that the information in registers 85 and 95 is transferred to the empty register. The details of write control circuitry 255 will be explained later with reference to FIGURE 5.

When line 75N is activated, tuck-away control circuit 266 transfers the information stored in one of the registers 201 to 204 to registers 85 and 95 and then activates line 75T. Tuck-away control circuit 266 has five input lines and five output lines. Input line 75N indicates when a transfer operation is to be performed and lines 201D to 204D indicate which of the registers 201 to 204 have information stored therein. Output lines 266A to 266D through OR circuits 221 to 224 control gates 211, 213, 215 and 217 which in turn control the transfer of information from registers 201, 202, 203 and 204 to registers 85 and 95. Hence, when tuck-away control circuit 266 receives a signal on line 75N, it interrogates lines 201D to 204D to determine which of the registers 201 to 204 has information stored therein and it activates one of the lines 266A to 266D to condition one of the gates 211, 213, 215 or 217 in order to transfer the information stored in one of the registers 201 to 204 into registers 85 and 95. At the same time it activates line 75T to tell the remainder of the system that the information has been transferred from one of the registers 201 to 204 to registers 85 and 95.

After information has been transferred out of one of the registers 201 to 204 by tuck-away control circuit 266 the register from which the information was transferred is reset to ZERO through reset lines 201R to 204R by the associated delay circuit 231 to 234. Delay circuits 231 to 234 are activated by lines 266A to 266D. Hence, a signal on one of the lines 266A to 266D first activates one of the gates 211 to 217 which caused the data in the associated register to be transferred to registers 85 and 95, and after a delay introduced by one of the delay circuits 231 to 234 it activates one of the lines 201R to 204R resetting the associated register to ZERO. The details of tuck-away control circuit 266 will be explained later with reference to FIGURE 6.

The details of register 201, gates 210 and 211 and the manner in which gates 210 and 211 are connected to circuit 201 is shown in FIGURE 3. The details shown in FIGURE 3 specifically refers to register 201; however, since each of the registers 201 to 204 is identical to the register shown in FIGURE 3 the following explanation is equally descriptive of any one of the registers 201 to 204.

Register 201 (FIGURE 3) has forty-two bit positions, ONE to FORTY-TWO. These forty-two bit positions are divided into two sections. The first section has fourteen bit positions, ONE to FOURTEEN, for storing an address and the second section has twenty-four bit positions, FIFTEEN to FORTY-TWO, for storing a data word. It should be noted that for convenience in illustration all of the bit positions in register 201 are not shown in FIGURE 3. Only the first and last bit positions in each section of the registers are shown however, since each of the positions not shown is identical to those which are shown no confusion should result. Register 201 also includes an ON-OFF indicator 201I, the output of which is connected to line 201D.

Each of the bit positions ONE to FORTY-TWO and ON-OFF indicator 201I includes a bistable device which has a set input (designated by an S), a reset input (designated by an R) and an output line. When the S line for any bit position is activated the bistable device associated with the particular bit position is set to a first stable state which activates the associated output line and when the R line for any bit position is activated the bistable device associated with the bit position is set to a second stable state which deactivates the output line. The bistable device associated with bit positions ONE to FORTY-ONE and ON-OFF indicator 201I may be constructed of any type of bistable element which operates quickly such as transistor flip-flops, tunnel diodes, or thin magnetic film devices.

The set line for each of the bit positions and the set line for ON-OFF indicator 201I are controlled by gate circuit 210. The gate circuit 210 includes an individual gating element for each bit position. The control line for each of the individual gating elements in gating circuit 210 is connected to line 255A. Hence, when line 255A is activated the forty-two lines in cable 201A are connected to the S lines of the forty-two bit positions ONE to FORTY-TWO and the ON-OFF indicator 201I is set to the ON condition. When line 201R is activated each of the bit positions ONE to FORTY-TWO and the ON-OFF indicator 201I are reset to the OFF condition.

Similar to gate circuit 210 circuit 211 includes an individual gating element connected in the output line of each bit position ONE to FORTY-TWO. The control line for each of the individual gating elements in gate circuit 211 are connected to line 221A. When line 221A is activated the forty-two lines in cable 201B are activated in accordance with the state of bit positions ONE to FORTY-TWO.

The output lines of the first fourteen bit positions ONE to FOURTEEN (i.e., those bit positions which are used to store an address) are also connected to fourteen lines in output cable 201C. Hence, the output lines of the first fourteen bit positions always activate the lines in output cable 201C in accordance with the information stored in the first fourteen bit positions.

Figure 4:
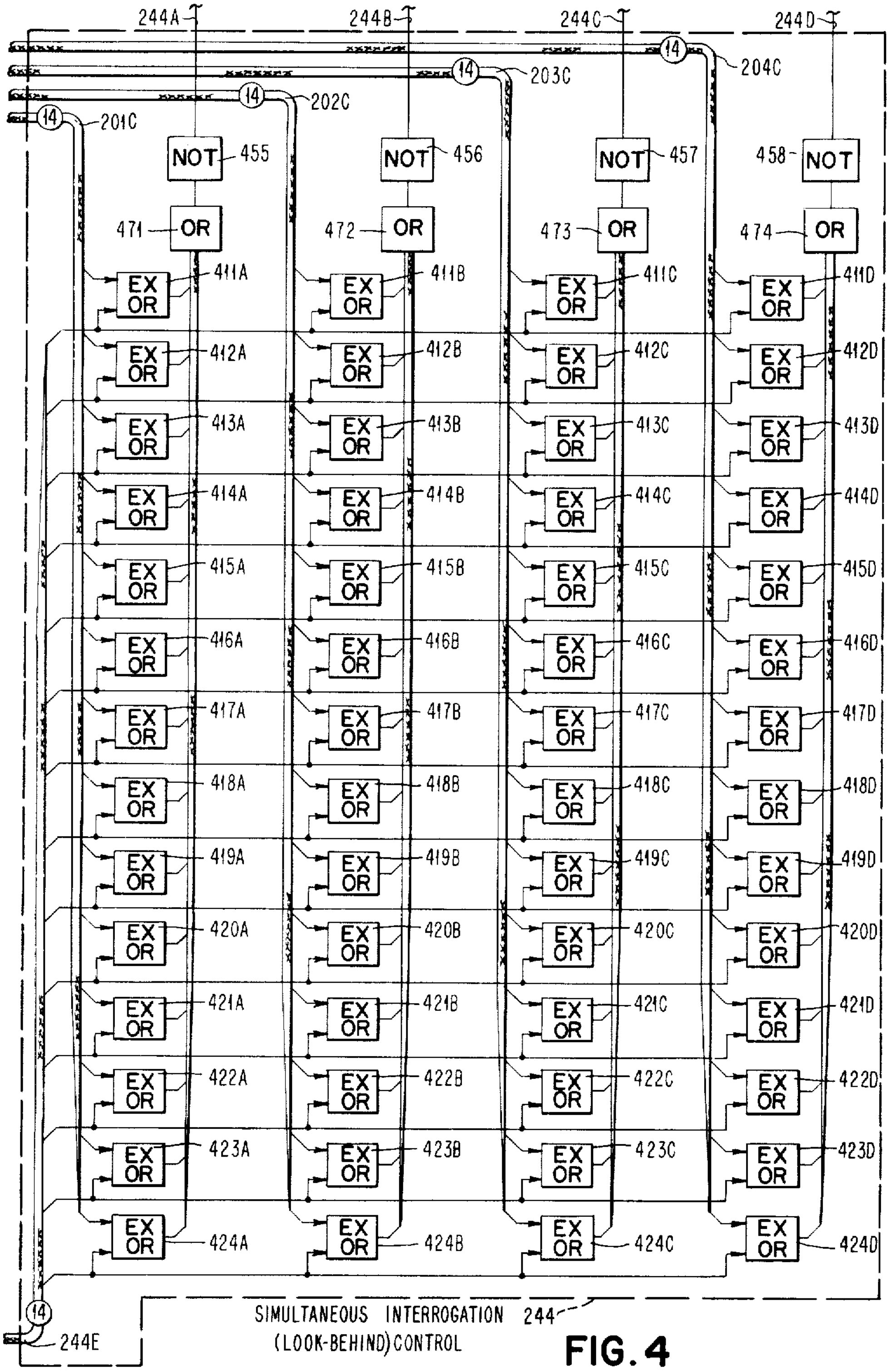
FIGURE 4 is a detailed circuit diagram of the simultaneous interrogation controls shown in block form in FIGURE 2.

The details of the simultaneous interrogating circuit 244 (i.e., the look behind control circuit 244) are shown in FIGURE 4. Circuit 244 includes EXCLUSIVE OR circuits 411A to 424A, 411B to 424B, 411C to 424C and 411D to 424D, NOT circuits (inverters) 455 to 458, and (inclusive) OR circuits 471 to 474. Circuit 244 has five input cables 244E and 201C to 204C and four output lines 244A to 244D.

The manner in which the address received on cable 244E is compared to the address received on cable 201C by AND circuits 411A to 424A will be explained in detail. The manner in which the address received on cable 244E is compared to the addresses received on each of the other cables 202C to 204C is identical to the manner in which the address received on cable 244E is compared to the address received on cable 201C and no explanation thereof will be given.

Each of the fourteen signals received on cable 201C is compared to the corresponding signal received on cable 244E by one of the fourteen EXCLUSIVE OR circuits 411A to 424A. For example, EXCLUSIVE OR circuit 411A compares the signal received from the first bit position in register 201 to the signal received from the first bit position in register 85, EXCLUSIVE OR circuit 412A compares the signal received from the second bit position in register 201 to the signal received from the second bit position in register 85, etc. The only time the output of any one of the EXCLUSIVE OR circuits 411A to 424A is active is when the associated bit position in both register 85 and in register 201 are in different states. Hence, if each of the first fourteen bit positions in register 201 is in the same state as the corresponding bit position in register 85, none of the EXCLUSIVE OR circuits 411A to 424A will have an output. The outputs of EXCLUSIVE OR circuits 411A to 424A are connected to the inputs of OR circuits 471. Hence, if the output of any one of the EXCLUSIVE OR circuits 411A to 424A is active, the output of OR circuit 471 will be active. The output of OR circuit 471 is connected to the input of NOT circuit 455, and the output of NOT circuit 455 is connected to output line 244A; hence, output 244A is active when the output of none of the EXCLUSIVE OR circuits 411A to 424A is active and, as previously established, the output of each of the EXCLUSIVE OR circuits 411A to 424A is inactive when the associated bit position in register 201 is in the same state as the associated bit position in register 85. Therefore, output 244A is only active when the address stored in the first fourteen bit positions of register 201 is the same address stored in the register 85.

Likewise, output 244B is only active when the address stored in the first fourteen bit positions of register 202 is the same as the address stored in register 85, output 244C is only activated when the address stored in the first fourteen bit positions of register 203 is the same as the address stored in register 85, and output 244D is only active when the address stored in the first fourteen bit positions of register 204 is the same as the address stored in register 85.

The details of write control circuit 255 are shown in FIGURE 5. Write control circuit 255 includes a selector 511, four AND circuits 521 to 524, and an OR circuit 531. Selector 511 has five input lines 201D to 204D and 511E and four output lines 511A to 511D. One and only one of the output lines is activated at any particular time and each time input line 511E is activated a different output line is activated. Each of the output lines 511A to 511D is associated with one of the input lines 201D to 204D and if the associated input line is activated the associated output line is never activated. Each time line 511E is activated (after a slight delay) the output line then activated is deactivated and the next output line which can be activated due to the state of input lines 201D to 204D is activated. Selector 511 may be a conventional four position ring circuit which has gates associated with each stage so that a particular stage will be skipped in the progression of the ring when the associated input line 201D to 204D is activated.

Each of the output lines 511A to 511D is connected to the input of one of the AND circuits 521 to 524. The second input of each of the AND circuits 521 to 524 is connected to input line 75A. The output of AND circuits 521 to 524 are respectively connected to output lines 255A to 255D. Hence, only one of the output lines 255A to 255D is activated at any one particular time since only one of the input lines 511A to 511D is activated by selector 511 at any one time. Furthermore, none of the output lines 255A to 255D is activated unless input line 75A is activated. The output of AND circuits 521 to 524 are also connected to the inputs of OR circuit 531. Hence, each time one of the outputs of AND circuits 521 to 524 is activated the output of OR circuit 531 is activated thereby advancing selector 511 after a slight delay introduced by delay circuitry in circuit 511.

The operation of write control circuit 255 can be summarized as follows: When input line 75A is activated, one of the output lines 255A to 255D is activated. Each time input 75A is activated a different one of the output lines 255A to 255D is activated. Lines 201D to 204D which indicate which registers are full are used to selectively prevent the lines 255A to 255D which are associated with registers which already contain information from being activated thereby preventing information from being stored in any register 201 to 204 which is already storing information.

The details of tuck-away control circuit 266 are shown in FIGURE 6. Tuck-away control circuit 266 includes selector circuit 611, four AND circuits 621 to 624, OR circuit 631 and a timer 632. Tuck-away control circuit 266 has five input lines 201D to 204D which indicate which registers 201 to 204 are storing information and an input line 75N which indicates when the central processing unit 11 is not accessing the memory complex 12. Tuck-away control circuit 266 has four output lines 266A to 266D which control the transfer of information from registers 201 to 204 into registers 85 and 89 and an output line 75T which indicates when a transfer operation is being performed.

Selector switch 611 has five inputs, 201D to 204D and 631A and four outputs 611A to 611D. The construction of selector switch 611 is similar to the previously described selector switch 511 except that in selector switch 611 each of the outputs 611A to 611D can only be activated if the associated input 201D to 204D is activated. Hence, as input 631A is activated selector switch 611 sequentially activates those outputs 611A to 611D associated with input lines 201D to 204D which are activated. Input 75N activates the input of the timer 632. Timer 632 periodically samples input 75N and if, when it samples input 75N, it is active, timer 632 activates output 632A for a certain prespecified period of time which is long enough to allow a transfer of operations to be performed. If, when timer 632 samples input 75N, input 75N is not activated, the output 632A is not activated. There is a delay between the outputs produced by timer 632 so that transfer operations will not prevent central processing unit 11 from gaining access to memory complex 12 for longer than one transfer operation. Output 632A activates one of the inputs to AND circuits 621 to 624 and the second input to AND circuits 621 to 624 is activated by the outputs 611A to 611D of selector 611. The outputs of AND circuit 621 to 624 activates the inputs of OR circuit 631 and output lines 266A to 266D. The output of OR circuit 631 activates output line 75T and line 631A which advances selector 611.

The operation of tuck-away control circuit 266 can be summarized as follows: When input 75N is activated, thereby indicating that the central processing unit 11 is not accessing the memory complex 12, the tuck-away control circut 266 activates output line 75T and sequentially activates those outputs 266A to 266D associated with registers which have information stored therein.

Figure 8:
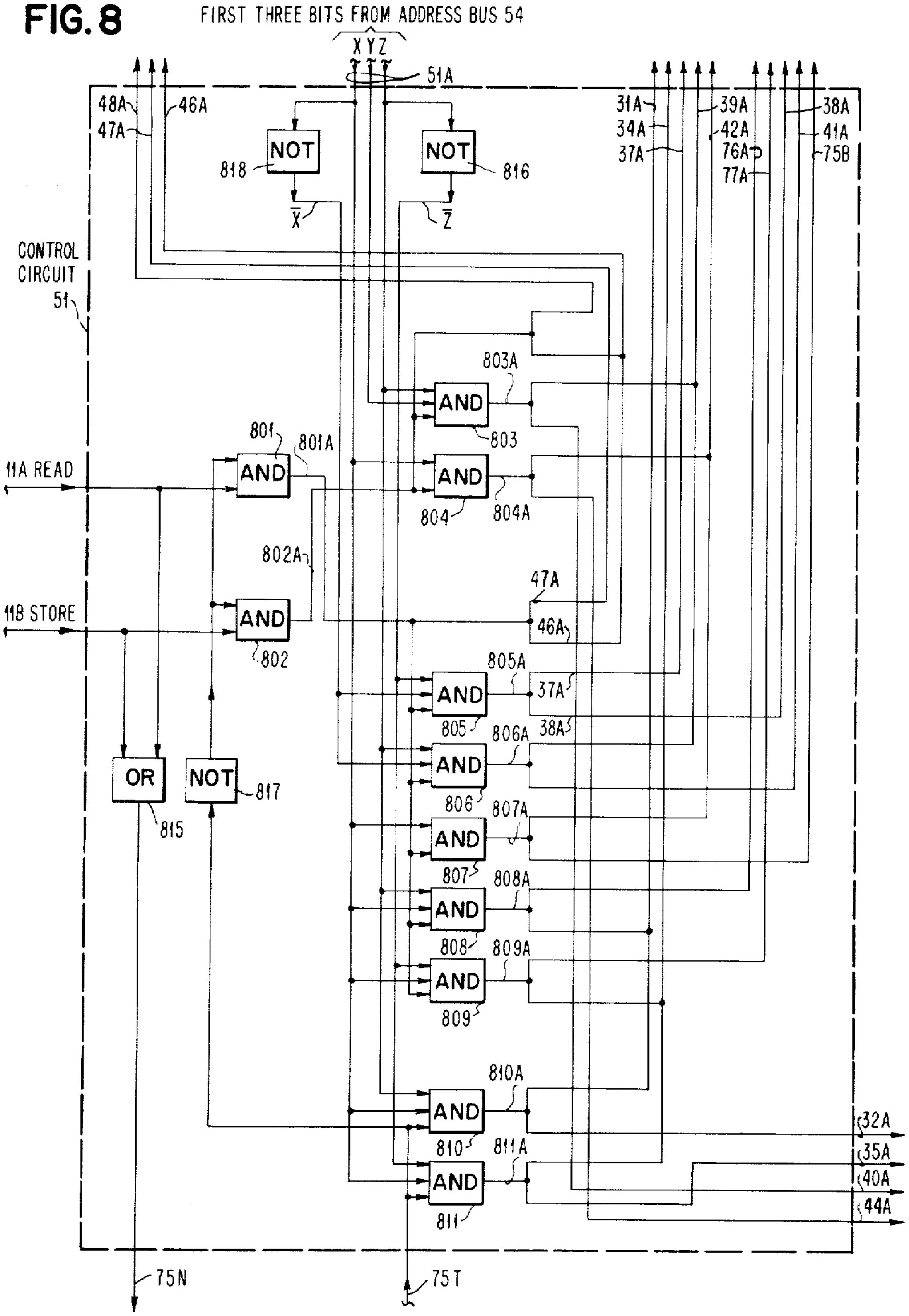
FIGURE 8 is a detailed circuit diagram of the control circuit shown in block form in FIGURE 1*b*.

The details of control circuit 51 which is shown in block form in FIGURE 1*b* are shown in FIGURE 8. Control circuit 51 interrogates the addresses which are applied to address bus 54 and it controls the various gating operations in accordance therewith. For purposes of illustration in the embodiment of the invention shown herein, three bits of each address, hereinafter respectively designated as the X, Y and Z bits, are used to designate the particular memory 21, 22, 23 or 24 wherein a particular storage register is located. The state of the three address bits X, Y and Z which designate the various memories is shown in the table of FIGURE 7. Control circuit 51 includes eleven AND circuits 801 to 811 an OR circuit 815, NOT circuits 816, 817 and 818, three inputs 11A, 11B and 75T and eighteen outputs.

Inputs 11A and 11B are activated by central processing unit 11 and they respectively indicate when the central processing unit 11 wants to read information from or store information into the memory complex 12. Input 75T is activated by control circuit 75 to indicate when a data word is being transferred from intermediate memory 25 to one of the nondestructive read memories 21 or 22. The outputs of control circuit 51 control certain of the gate circuits 31 to 48, one input of each of the AND circuits 76 and 77 and certain of the inputs of control circuits 71 to 75.

When line 11A is activated, it indicates that the central processing unit 11 desires to read a data word from some memory location in memory complex 12, and if input line 75T is not activated, indicating that a data transfer operation is not being performed, activation of line 11A activates AND circuit 801 which in turn activates line 801A which activates output lines 46A and 47A and one input to each of the AND circuits 805 to 809. The activation of line 46A transmits the address from address register 61 of the central processing unit 11 to the address bus 54 which in turn activates the X, Y and Z inputs to circuit 51. If the Y input is activated and the X and Z inputs are not activated, thereby indicating that information is to be read from the read only memory 23, the output of AND circuit 805 is activated thereby activating line 805A which activates lines 37A and 38A. The activation of line 37A gates the address from address bus 54 to register 83 of read only memory 23 and it activates line 73A in control circuit 73 causing the read only memory to read the desired data word into register 93 and activation of line 38A conditions gate 38 so that the information is transferred from register 38 to data bus 53 and then to register 62.

If the Y and Z inputs from address bus 54 are activated indicating that the data word is to be read from scratch pad memory 24, output 806A of AND circuit 806 is activated activating lines 39A and 41A. Activation of line 39A gates the address from address bus 54 to register 84 and the activation of line 41A activates input 74B to control circuit 74 causing the desired word to be read from memory 24 to register 94. The activation of line 41A also conditions gate 41 so that the desired data word is transferred from register 94 to register 62.

If input X is activated indicating that the information is to be read from one of the nondestructive read memories 21 or 22, output 807A is activated by AND circuit 807 activating lines 42A and 75B. Activation of line 42A gates the address from address bus 54 to register 85 and activation of line 75B initiates the operation of control circuit 75 so that all of the registers in intermediate memory 25 are interrogated to determine if any register has stored therein the address which is placed in register 85. Whenever line X is activated, either line Z or line NOT Z is activated thereby indicating that the information is to be read from either nondestructive read memory 21 or from nondestructive read memory 22. If lines X and Z are simultaneously activated indicating that the information is to be read from nondestructive read memory 21, AND circuit 808 activates output line 808A which in turn activates output lines 76A and 31A. Activation of line 31A causes the address to be transferred from address bus 54 to register 81 and activation of line 76A activates control 71 so that memory 21 begins to read the desired memory location. If control circuit 75 activates line 75G, indicating that the desired word is not in intermediate memory 25, gate 33 is conditioned through AND circuit 76 transferring the word which is placed in register 91 to data bus 53.

If input X and inputs Y and Z are not simultaneously activated, indicating that the desired word is to be read from nondestructive read memory 22, AND circuit 809 activates output 809A which in turn activates lines 77A and 34A. The operation is then similar to the operation described above with reference to memory 21.

If, when central processing unit 11 activates line 11B, input line 75T is not activated, AND circuit 802 activates line 802A which in turn activates lines 46A and 48A and one input to AND circuits 803 and 804. Activation of line 46A transfers the address from register 61 to address bus 54 and activation of line 48A conditions gate 48 so that any information placed on data bus 53 will be transferred to data register 62. If, after line 802A is activated, lines Y and Z become activated, indicating that the data word in register 62 is to be stored in memory 24, AND circuit 803 activates output line 803A which in turn activates lines 39A and 40A. Activation of line 39A conditions gate 39 so that the address on address bus 54 is transferred to register 84 and activation of line 40A conditions gate 40 so that the data word on bus 53 is transferred to register 94. The activation of line 40A also conditions control circuit 74 so that the data word in register 94 is stored in the location specified by the address in register 84. If after line 802A is activated, line X is activated indicating that the data word is to be stored in either memory 21 or 22, AND circuit 804 activates output line 804A which in turn activates output lines 42A and 44A. Activation of line 42A conditions gate 42 so that the address on address bus 54 is transferred to register 85 and activation of line 44A conditions gate 44 so that the information on data bus 53 is transferred to register 95. Activation of line 44A also activates line 75A which activates control circuit 75 so that the information in registers 85 and 95 is stored in memory 25.

When control circuit 75 activates line 75T, indicating that a transfer operation is to be performed, gate 43 is conditioned by line 43A which is connected to line 75T thereby transferring the address from register 85 to address bus 54 and thus to control circuit 51. It should be noted that the activation of line 75T also activates output line 75C through OR circuit 226.

If, after line 75T is activated, inputs X and Z are activated, indicating that the word in register 95 is to be stored in memory 21, AND circuit 810 activates output line 810A which activates lines 31A and 32A. Activation of line 31A conditions gate 31 so that the address on address bus 54 is transferred to register 81 and activation of line 32A conditions gate 32 so that data word on data bus 53 is transferred to register 91. Activation of line 32A also activates input 71A of control circuit 71 thereby causing the word in register 91 to be read into memory 21. If after line 75T is activated the X input and the NOT Z input are activated thereby indicating that the word on data bus 53 is to be stored in memory 22, AND circuit 811 activates line 811A which in turn activates lines 34A and 35A. The activation of line 34A conditions gate 34 so that the address on address bus 54 is transferred to register 82. The activation of line 35A conditions gate 35 so that the data word on data bus 53 is transferred to register 92 and activation of line 35A also activates input 72A of control circuit 72 causing the data word in register 92 to be read into memory 22.

It should be noted that if lines 11A or 11B are activated by central processing unit 11, indicating that the central processing unit 11 desires access to the memory complex 12 in order to either write a word therein or in order to read a word therefrom, and if at the time that line 11A or 11B is activated, line 75T is activated indicating that a transfer operation is to be performed, the output of NOT circuit 817 is not activated and hence an input to each of the AND circuits 801 to 802 is not activated. Therefore, line 801A or line 802A is not activated until the transfer operation is completed and line 75T becomes deactivated. Since line 75T is deactivated for a short period of time between successive transfer operations, the central processing unit 11 is never held up for a longer time than the time required for one transfer operation. Generally, the central processing unit will not be held up by a transfer operation since a very small amount of time is required to gate a data word from memory 25 to memories 21 or 22.

It should be understood that various changes can be made in the form and details of the embodiment without departing from the spirit and scope of the invention. For example, in the embodiment of the invention shown herein, the same buses are used (1) to transfer addresses and data words from the central processing unit 11 to memory complex 12 and (2) to transfer addresses and data words from intermediate memory 25 to nondestructive read memories 21 and 22. The system can operate with a higher degree of simultaneity if a separate bus system is provided to handle each of the above operations.

If a first bus system is provided to transfer addresses and data words between central processing unit 11 and memory complex 12 and a second bus system is provided to transfer addresses and data words between intermediate memory 25 and nondestructive read memory 21 and 22, the central processing unit 11 can be reading a data word from read only memory 25 or from scratch pad memory 24 while the system is simultaneously transferring a word from intermediate memory 25 to one of the nondestructive read memories 21 or 22. Likewise with two bus systems the central processing unit can be reading a word from one of the nondestructive read memories 21 or 22 or writing a word in one of the nondestructive read memories 21 or 22 while a word is being transferred from intermediate memory 25 to the other nondestructive read memory 21 or 22.

Furthermore, the system may include an input-output data channel and the bus which is used to transfer words from intermediate memory 25 to nondestructive read memories 21 or 22 can be used by the data channel to store information in the nondestructive read memories 21 or 22.

Each of the memories 21 to 25 has been shown herein as having an associated address register 81 to 85 and associated data registers 91 to 95. Naturally it should be understood that in accordance with the practice in the art, in order to increase the speed of the system these registers can be eliminated and the data words can be transmitted directly from the various buses to the various memories and from the various memories directly to the various buses.

As is the practice in the art, the system could include various interlock features. For example, an interlock could be provided to handle the situation which may arise when each of the registers in intermediate memory 25 has information stored therein and the system attempts to transfer another data word from central processing unit 11 to memory 25. In such a case the interlock system could either activate gates so that the word would be transferred directly from the central processing unit 11 to the appropriate nondestructive read memory 21 or 22 the interlock could merely hold up operation of the central processing unit 11 until the tuck-away control 266 transferred one of the words from intermediate memory 25 to the appropriate nondestructive read memory 21 or 22. Other interlocks could also be provided.

While the invention has been particularly shown and described with reference to preferred embodiments thereof, it will be understood by those skilled in the art that various changes in form and details may be made therein without departing from the spirit and scope of the invention.

What is claimed is:

1. In a digital computing system, in combination, a memory complex having addressable storage locations for storing data words, a processing unit to generate (a) a request to read the data word stored in a particular memory location, (b) a request to write a particular data word in a particular memory location, (c) data manifestations representing the address of the particular storage location from which a data word is to be read or where a data word is to be stored and (d) data manifestations representing a particular data word which is to be stored, said memory complex including a large nondestructive read memory and a small intermediate memory, first control means responsive to memory write requests generated by said processing unit to store both the data word and the address, which are generated by said processing unit, in a storage location in said intermediate memory, second control means to transfer automatically a data word stored in a memory location in said intermediate memory to the memory location in said nondestructive dead memory, the address of which is stored in the same location as said data word, third control means responsive to memory read requests generated by said processing unit to interrogate simultaneously each location in said intermediate memory to determine if any location in said intermediate memory has stored therein the same address as is generated by said processing unit and to interrogate the particular memory location in said nondestructive read memory, the address of which is generated by said processing unit, means responsive to said third control means when the address generated by said processing unit is stored in a particular location in said intermediate memory to prevent information from being transferred from said nondestructive read memory to said processing unit and to transfer the information stored in the particular location in said intermediate memory to said processing unit.

2. In a digital computing system, in combination, a memory complex having addressable storage locations for storing data words, a processing unit to generate (a) a request to read the data word stored in a particular memory location, (b) a request to write a particular data word in a particular memory location, (c) data manifestations representing the address of the particular storage location from which a data word is to be read or where a data word is to be stored and (d) data manifestations representing a particular data word which is to be stored, said memory complex including a nondestructive read memory and an intermediate memory, first control means responsive to memory write requests from said processing unit for storing both the data manifestations representing a data word and the data manifestations representing an address which is generated by said processing unit in a memory location in said intermediate memory, second control means to transfer the data manifestations representing a data word from a memory location in said intermediate memory to the address specified by the data manifestations which represent an address and which are stored in the same location of said intermediate memory, third control means responsive to a request from said processing unit to read the data manifestations stored in a particular memory location in said nondestructive read memory only when said data manifestations representing the address of said latter particular memory location are not in said intermediate memory, to interrogate the specified location in said nondestructive read memory and to interrogate simultaneously each location in said intermediate memory to determine if any location has stored therein the data manifestations representing the address of said particular memory location, and fourth control means responsive to said third control means to transfer the desired data manifestations from said intermediate memory to said central processing unit when the data manifestation representing said particular address are stored in one of said locations in said intermediate memory and to transfer the data from the specified location in said nondestructive read memory to said processing unit when the intermediate memory does not contain the data manifestations representing said particular address in any location.

3. In a digital computing system, in combination, a memory complex having addressable storage locations for storing data words, a processing unit to generate (a) a request for reading the data word stored in a particular memory location, (b) a request for writing a particular data word in a particular memory location, (c) data manifestations representing the address of the particular storage location from which a data word is to be read or where a data word is to be stored and (d) data manifestations representing a particular data word which is to be stored, said memory complex including a large nondestructive read memory and a small intermediate memory, first control means responsive to memory write requests generated by said processing unit to store both the data word and the address which are generated by said processing unit in a storage location in said intermediate memory, second control means to transfer automatically a data word stored in a memory location in said intermediate memory to the memory location in said nondestructive read memory, the address of which is stored in the same location as said data word, control means to determine whether the requested data word has as yet been transferred from said intermediate to said nondestructive read memory, means responsive to said control means to transfer the requested data word from said intermediate memory to said processing unit when said data word has not as yet been transferred from said intermediate memory to said nondestructive read memory and to transfer said data word from said nondestructive read memory to said processing unit when said data word has already been transferred from said intermediate memory to said nondestructive read memory.

4. In a digital computing system, in combination, a memory complex having addressable storage locations for storing data words, a processing unit to generate (a) a request for reading the data word stored in a particular memory location, (b) a request for writing a particular data word in a particular memory location, (c) data manifestations representing the address of the particular storage location from which a data word is to me read or where a data word is to be stored and (d) data manifestations representing a particular data word which is to be stored, said memory complex including a large nondestructive read memory, a first small high speed memory and a second small high speed memory, first control means responsive to said memory write requests generated by said processing unit, to store both the data word and the address which are generated by said processing unit in a storage location in said second high speed memory when the address generated by said processing unit is the address of a storage location in said nondestructive read memory and to store the data word generated by said processing unit in the storage location the address of which is generated by said processing unit when the address generated by said processing unit is the address of a storage location in said first small high speed memory, second control means to transfer automatically a data word stored in a memory location in said second high speed memory to a location in said nondestructive read memory, the address of which is stored in the same location as said data word, third control means responsive to requests generated by said processing unit to read storage locations in said nondestructive read memory and to interrogate simultaneously each location in said second high speed memory to determine if any location in said second high speed memory has stored therein the same address as is generated by said processing unit and to interrogate the particular memory location in said nondestructive read memory, the address of which is generated by said processing unit, means responsive to said third control means when the address generated by said processing unit is stored in a particular location in said second high speed memory to prevent information from being transferred from said nondestructive read memory to said processing unit and to transfer the information stored in the particular location in said second high speed memory to said processing unit, fourth control means responsive to requests generated by said processing unit to read storage locations in said first high speed memory to read the particular memory location in said first high speed memory the address of which is generated by said processing unit and to transfer the data word which is read to said processing unit.

5. In a digital computing system, in combination, a memory complex having addressable storage locations for storing data words, a processing unit to generate (a) a request for reading the data word stored in a particular memory location, (b) a request for writing a particular data word in a particular memory location, (c) data manifestations representing the address of the particular storage location from which a data word is to be read or where a data word is to be stored and (d) data manifestations representing a particular data word which is to be stored, said memory complex including a medium size nondestructive read memory, a large read only memory and a small intermediate memory, first control means responsive to said memory write requests generated by said processing unit to store both the data word and the address which are generated by said processing unit in a storage location in said intermediate memory when the address generated by said processing unit is the address of a storage location in said nondestructive read memory, second control means to transfer automatically a data word stored in a memory location in said intermediate memory to the memory location in said nondestructive read memory, the address of which is stored in the same location as said data word, third control means responsive to requests generated by said processing unit to read storage locations in said non-destructive read memory and to interrogate simultaneously each location in said intermediate memory to determine if any location in said intermediate memory has stored therein the same address as is generated by said central processing unit and to interrogate the particular memory location in said nondestructive read memory, the address of which is generated by said central processing unit, means responsive to said third control means when the address generated by said processing unit is stored in a particular location in said intermediate memory to prevent information from being transferred from said nondestructive read memory to said processing unit and to transfer the information stored in the particular location in said intermediate memory to said processing unit, fourth control means responsive to requests generated by said processing unit to read storage locations in said read only memory for reading the particular memory location in said read only memory the address of which is generated by said processing unit and to transfer the data word which is read to said processing unit.

6. In a digital computing system, in combination, a memory complex having addressable storage locations for storing data words, a processing unit to generate (a) a request to read the data word stored in a particular memory location, (b) a request to write a particular data word in a particular memory location, (c) data manifestations representing the address of the particular storage location from which a data word is to be read or where a data word is to be stored and (d) data manifestations representing a particular data word which is to be stored, said complex memory including an intermediate size nondestructive read memory, a large read only memory, a first small high speed memory, and a second small high speed memory, first control means responsive to said memory write requests generated by said processing unit, to store both the data word and the address which are generated by said processing unit in a storage location in said second small high speed memory when the address generated by said processing unit is the address of a storage location in said nondestructive read memory and, to store the data word generated by said processing unit in the storage location the address of which is generated by said processing unit when the address generated by said processing unit is the address of a storage location in said first small high speed memory, second control means to transfer automatically a data word stored in a memory location in said second high speed memory to the memory location in said nondestructive read memory, the address of which is stored in the same location as said data word, third control means responsive to requests generated by said processing unit to read storage locations in said nondestructive read memory and to interrogate simultaneously each location in said second high speed memory to determine if any location in said second high speed memory has stored therein the same address as is generated by said processing unit and for interrogating the particular memory location in said nondestructive read memory, the address of which is generated by said processing unit, means responsive to said third control means when the address generated by said processing unit is stored in a particular location in said second high speed memory to prevent information from being transferred from said nondestructive read memory to said processing unit and to transfer the information stored in the particular location in said second high speed memory to said processing unit, fourth control means responsive to requests generated by said processing unit to read storage locations in said first high speed memory or in said read only memory to read out the particular memory location in said read only memory or in said first high speed memory the address which is generated by said processing unit and to transfer the data word which is read to said processing unit.

7. In a digital computing system in combination, a memory complex including a large first memory having addressable storage locations for storing data words, said memory complex also including a plurality of temporary storage registers each capable of storing both an address and a data word, a processing unit to generate (a) a request for reading the data word stored in a particular memory location, (b) a request for writing a particular data word in a particular memory location, (c) data manifestations representing the address of the particular storage location from which a data word is to be read or where a data word is to be stored and (d) data manifestations representing a particular data word which is to be stored, first control means responsive to memory write requests generated by said processing unit to store both the data word and the address which are generated by said processing unit in one of said temporary storage registers, second control means to transfer automatically a data word stored in one of said temporary storage registers to the memory location in said first memory, the address of which is stored in the same temporary storage register as said data word, third control means responsive to memory read requests generated by said processing unit, said third control means including control means to interrogate simultaneously each temporary storage register to determine if any of said temporary storage register has stored therein the same address as is generated by said processing unit, and means to interrogate the particular memory location in said first memory the address of which is generated by said processing unit, and means responsive to said third control means when the address generated by said processing unit is stored in a particular temporary storage register to prevent information from being transferred from said first memory to said processing unit and to transfer the information stored in the particular temporary storage register to said processing unit.

8. In a digital computing system, in combination, a memory complex including a large nondestructive read memory having addressable storage locations for storing data words, said memory complex also including a plurality of temporary storage registers each to store both an address and a data word, first means to generate a request to read the data word stored in a particular storage location in said nondestructive read memory and a request to write a particular data word in a particular storage location in said nondestructive read memory, first control means responsive to memory write requests to store both the particular data word and the particular address in one of said temporary storage registers, second control means to transfer automatically a data word stored in one of said temporary storage registers to the memory location in said nondestructive read memory, the address of which is stored in the same temporary storage register as said data word, third control means responsive to memory read requests, said third control means including control means to interrogate simultaneously each temporary storage register to determine if any of said temporary storage registers has stored therein the address of the particular location in said nondestructive read memory from which a data word is to be read, and means to read the data stored in the particular memory location in said nondestructive read memory, and means responsive to said third control means when the address of the particular location from which data is to be read is stored in a particular temporary storage register to prevent information from being transferred from said nondestructive read memory to said first means and to transfer the data word stored in the particular temporary storage register to said first means.

9. In a digital computing system, in combination, a memory complex including a large nondestructive read memory and a small high speed memory having addressable storage locations for storing data, said memory complex also including a plurality of temporary storage registers each capable of storing both an address and a data word, means to generate requests to read data from a storage location designated by a particular address and requests to write data into a storage location designated by a particular address, first control means responsive to requests to write data in a storage location specified by a particular address, to store both the particular data word and the particular address in one of said temporary storage registers when the particular address is the address of a storage location in said non-destructive read memory, and to store the particular data word in the storage location specified by said particular address when the address is the address of a storage location in said small high speed memory, second control means to transfer automatically a data word stored in one of said temporary storage registers to the memory location in said nondestructive read memory, the address of which is stored in the same temporary storage register as said data word, third control means responsive to requests to read data from a designated location in said nondestructive read memory, said third control means including control means to interrogate simultaneously each temporary storage register to determine if any of said temporary storage registers has stored therein the address of said designated location, and means to interrogate the designated location in said nondestructive read memory, means responsive to said third control means when the address of said designated memory location is stored in a particular temporary storage register to prevent information from being transferred from said nondestructive read memory and to read the data word stored in the particular temporary storage register.

10. In a digital computing system, in combination, a memory complex including a first memory and an intermediate memory, means to generate requests to write a particular data word in a particular storage location in said first memory and to generate requests to read a particular data word from a particular storage location in said first memory, means responsive to write requests to store both the address of said particular storage location and said particular data word in a storage location in said intermediate memory, control means to transfer the data word stored in said particular location in said intermediate memory to said particular location in said first memory specified by the address stored in the said storage location in said intermediate memory, control means responsive to a read request to determine if the said data word which is the object of said read request has as yet been transferred from said intermediate memory to said first memory, to read said data word from said intermediate memory if it has not as yet been transferred to said first memory, and to read said data word from said first memory if it has been transferred to said first memory, and to read said data word from said first memory when said address of said particular storage location thereof in said first memory is not stored in said intermediate memory.

References Cited by the Examiner

UNITED STATES PATENTS

| | | | |
|---|---|---|---|
| 2,968,791 | 1/1961 | Johnson et al. | 340—172.5 |
| 3,031,650 | 4/1962 | Koerner. | |
| 3,061,192 | 10/1962 | Terzian | 235—157 |

ROBERT C. BAILEY, *Primary Examiner.*

MALCOLM A. MORRISON, *Examiner.*

R. B. ZACHE, *Assistant Examiner.*